United States Patent [19]

Kasugai et al.

[11] Patent Number: 4,530,683
[45] Date of Patent: Jul. 23, 1985

[54] DEVICE FOR PREVENTING SEPARATION OF A BELT FROM A MOTOR PULLEY

[75] Inventors: Shouzi Kasugai, Nagoya; Tatsuya Sawato, Tajimi, both of Japan

[73] Assignee: Mitsubishi Denki Kabushiki Kaisha, Tokyo, Japan

[21] Appl. No.: 519,712

[22] Filed: Aug. 2, 1983

[30] Foreign Application Priority Data

Aug. 5, 1982 [JP] Japan .......................... 57-119152[U]

[51] Int. Cl.³ ............................................. B62J 13/00
[52] U.S. Cl. .................................... 474/144; 112/261
[58] Field of Search ......................... 474/144; 112/261

[56] References Cited

U.S. PATENT DOCUMENTS

| 965,335 | 7/1910 | Rosenbloom et al. | 474/144 X |
| 1,722,078 | 7/1929 | Dreyer et al. | 474/144 X |
| 2,168,501 | 8/1939 | Stoyanowski | 474/144 X |
| 2,295,582 | 9/1942 | Ingwer | 474/144 X |
| 4,422,396 | 12/1983 | Szostak | 474/144 X |

FOREIGN PATENT DOCUMENTS 1760810  6/1975  Fed. Rep. of Germany .

Primary Examiner—James A. Leppink
Assistant Examiner—Frank H. McKenzie, Jr.
Attorney, Agent, or Firm—Oblon, Fisher, Spivak, McClelland & Maier

[57] ABSTRACT

A device for preventing separation of a belt from a motor pulley comprises a protection cover for covering a pulley attached to the output shaft of a motor, a guide slot formed in the protection cover extending into a predetermined direction, a belt separation preventing plate supported on the side of the motor pulley by a supporting body which passes through the guide slot, and retaining device associated with the supporting body to fix the plate to the protection cover by a spring pressure.

6 Claims, 6 Drawing Figures

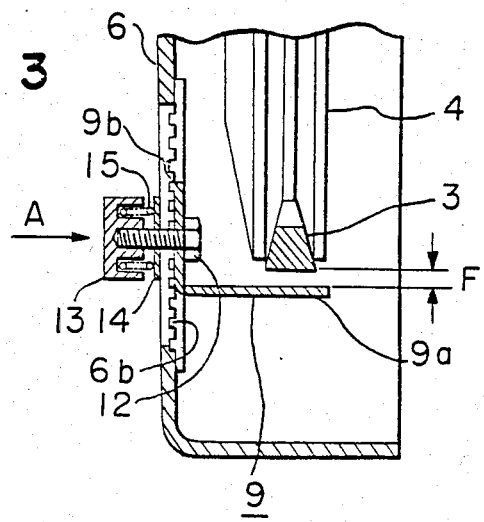
FIGURE 3
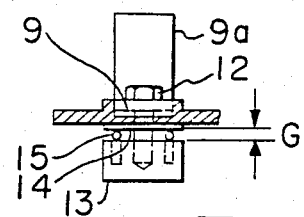
FIGURE 4
FIGURE 2
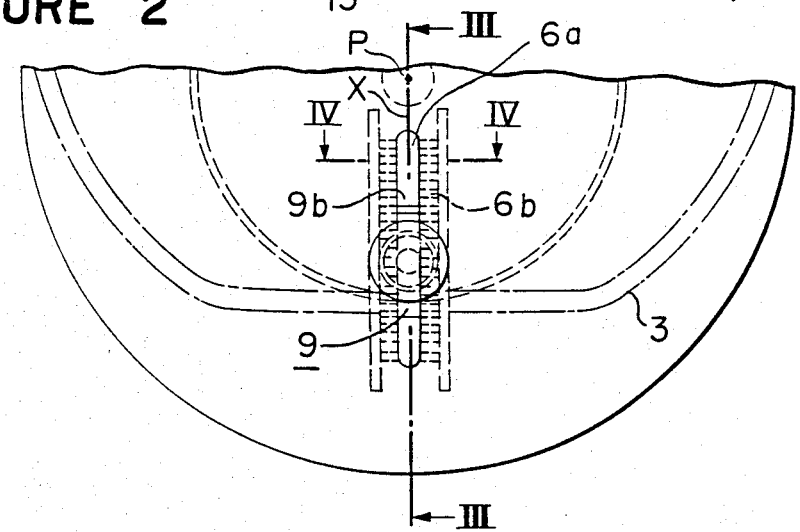

DEVICE FOR PREVENTING SEPARATION OF A BELT FROM A MOTOR PULLEY

BACKGROUND OF THE INVENTION

Field of the Invention

The present invention relates to a device for preventing separation of a belt from a motor pulley to drive a load through a belt. More particularly, it relates to an improvement in such device for preventing a belt from comming off from a pulley of a motor due to removal of a load at the time of non-operation of the motor.

The device of this type has been generally used in a clutch motor for driving a sewing machine because it has been necessary to frequently remove the sewing machine from a table or to incline it for the purpose of repair or adjustment of the machine.

Namely, the conventional device for preventing separation of the belt such as, for instance, in the West German Pat. No. 1760810 is constructed in such a manner that a protection cover is attached to a motor so as to cover one side of a pulley fixed to the output shaft of the motor, the protection cover being provided with a guide slot for permitting a bolt to pass therethrough and a belt separation preventing plate is attached to the protection cover by means of the bolt to prevent a V-belt wound on the motor pulley from comming off from the same. It is, therefore, necessary to move the belt separation preventing plate along the guide slot of the protection cover once the motor has been mounted in a position so that a space gap between the belt separation preventing plate and the outer peripheral surface of the V-belt in its stretching state has a predetermined dimension (generally, of about several millimeters) to prevent the V-belt from coming off the pulley due to its looseness when the sewing machine is removed from the table or inclined to the table for the purpose of repair or adjustment. Accordingly, it is desirous to perform an easy adjustment of the position of the belt separation preventing plate. In the conventional device, adjustment of the plate to fix it in a position has been carried out by fastening or releasing the bolt passing through the guide slot.

However, the conventional device has suffered such disadvantages that it has been necessary to use a spanner of the size which fits to the head of a bolt in order to fasten it to locate the belt separation preventing plate, with the consequence that a spanner for exclusive use is required as an accessory tool which has invited increasing of cost and furthermore, it has been difficult to carry out a fastening operation by using the spanner under the table.

SUMMARY OF THE INVENTION

It is an object of the present invention to overcome the disadvantages of the conventional device and to provide a device for preventing separation of a belt from a motor pulley which does not require a spanner for exclusive use and allows adjustment of position for fastening of a belt separation preventing plate through a simple operation.

The foregoing and the other objects of the present invention have been attained by providing a device for preventing separation of a belt from a motor pulley comprising a protection cover which covers a side portion of a pulley fixed to the output shaft of a motor and which is provided with a guide slot formed along the center line passing through the axial center of the output shaft; a belt separation preventing plate supported by a supporting body passing through the guide slot of the protection cover so as to be movable along the guide slot in a predetermined direction; and a retaining device for retaining the supporting body to fix the separation preventing plate to the protection cover by a spring pressure, wherein the belt separation preventing plate is adapted to be released from its engaging state caused by the spring pressure to thereby be movable along the guide slot.

BRIEF DESCRIPTION OF THE DRAWING

FIG. 2 is a side view of an important part of the device in FIG. 1;

FIG. 3 is a cross sectional view taken along the line III—III of FIG. 2;

FIG. 4 is a cross sectional view taken along the line IV—IV of FIG. 2;

DETAILED DESCRIPTION OF THE PREFERRED EMBODIMENT

Figure 1:
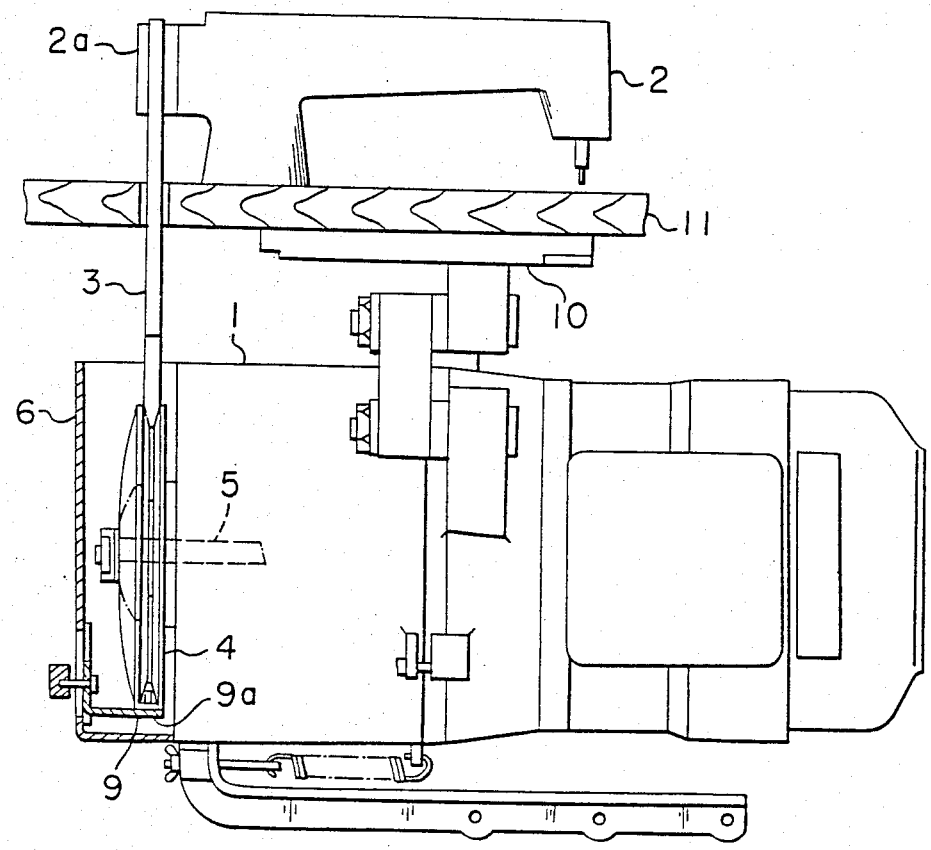
FIG. 1 is a side view, partly cross-sectioned, of an embodiment of the device for preventing separation of a belt of the present invention.

Preferred embodiments of the present invention will be described with reference to drawing.

In the figures, the reference numeral 1 designates a clutch motor (hereinbelow referred to as a motor); the numeral 2 designates a sewing machine having a machine pulley 2a on which a belt 3 such as a V-belt is wound and driven by the motor 1 through the belt 3; the numeral 4 designates a motor pulley secured to the output shaft 5 of the motor 1; the numeral 6 designates a protection cover attached to one side of the motor 1 to cover a side portion of the pulley 4; the numeral 6a designates a guide slot formed in the protection cover 6 along a center line X extending in the vertical direction passing through the axial center P of the output shaft 5; the numeral 9 designates a belt separation preventing plate for preventing the belt from coming off from the motor pulley, which is formed by bending a sheet material such as metal into an L-shape in longitudinal cross-section and is positioned inside the protection cover 6; the numeral 12 designates a bolt passing through the belt separation preventing plate 9 and the guide slot 6a of the protection cover 6 from the inside of the cover 6 to the outside; the numeral 13 designates a knob screw-fitted to the end of the bolt 12 extending from the protection cover; the numeral 14 designates a washer interposed between the knob 13 and the protection cover 6; the numeral 15 designates a compression spring which is housed at its one end in an annular groove 13a formed in the knob 13 and pushes at the other end the protection cover 6 through the washer 14 thereby forming a predetermined space gap G between the washer 14 and the knob 13. On the inner surface of the protection cover 6 and both sides of the guide slot 6a, a plurality of recesses 6b are formed at a fixed interval and at the right angle to the longitudinal direction of the guide slot 6a, while at least one projection 9b adapted to fit into any of the recesses 6b is formed, opposing the protection cover 6, on the upper portion of the belt separation preventing plate 9 in one-piece therewith. The reference numeral 10 designates a fitting arm and the numeral 11 designates a table.

Figure 5:
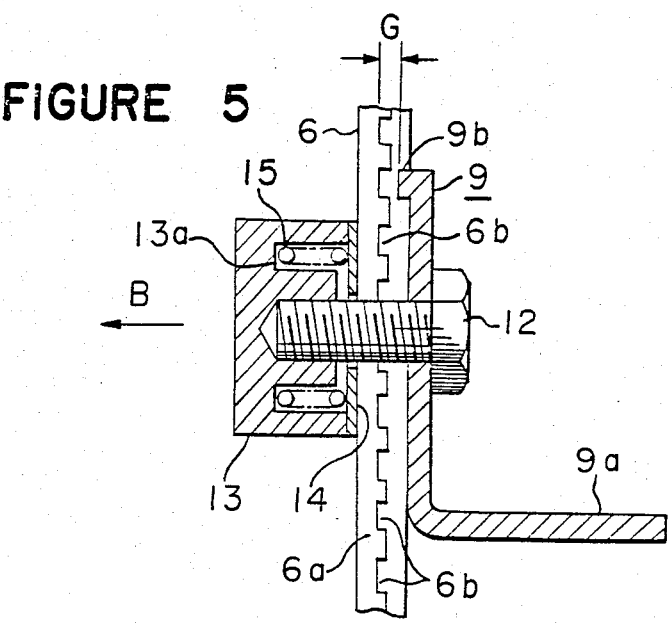
FIG. 5 is an enlarged view of an important part in FIG. 3.

In the device for preventing separation of a belt of the present invention having the construction mentioned above, when the knob 13 is pushed in the arrow mark direction A against the spring pressure of the compression spring 15 as shown in FIG. 3, the projection 9b of the belt separation preventing plate 9 is disengaged from one of the recesses 6b of the protection cover 6 as shown in FIG. 5. In this moment, the plate is freely movable in the vertical direction in a given range by the guidance of the guide slot 6a. Then, by moving the plate 9 such a position that the space gap between the belt 3 and the opposing part 9a of the plate to the belt comes closer to a predetermined distance F followed by releasing pushing force to the knob 13, the knob 13 is driven in the arrow mark direction B as in FIG. 5 by the spring pressure of the compression spring 15 and at the same time, the belt separation preventing plate 9 is drawn to the inner surface of the protection cover 6 through the bolt 12, whereby the projection 9b is brought to engage with the one of the recesses 6b of the protection cover 6. Thus, the plate 9 is secured to the inner surface of the protection cover 6 and the movement of the prevention plate in the vertical direction is prevented.

By securing the belt separation preventing plate 9 as described above, even though the sewing machine is removed from the table 11 or is inclined to the same, the belt does not come off from the pulley 4, but remains to be loose as shown by the one dotted chain line in FIG. 2 and the operation of winding a belt around a pulley can be easy when the sewing machine 2 is put the original position to be used.

In the embodiment described above, a number of recesses 6b are formed on the protection cover 6 and a single projection 9b is formed on the belt separation preventing plate 9. However, a similar effect can be attained by forming a number of recesses on the plate 9 and at least one projection 9b on the protection cover 6.

Figure 6:
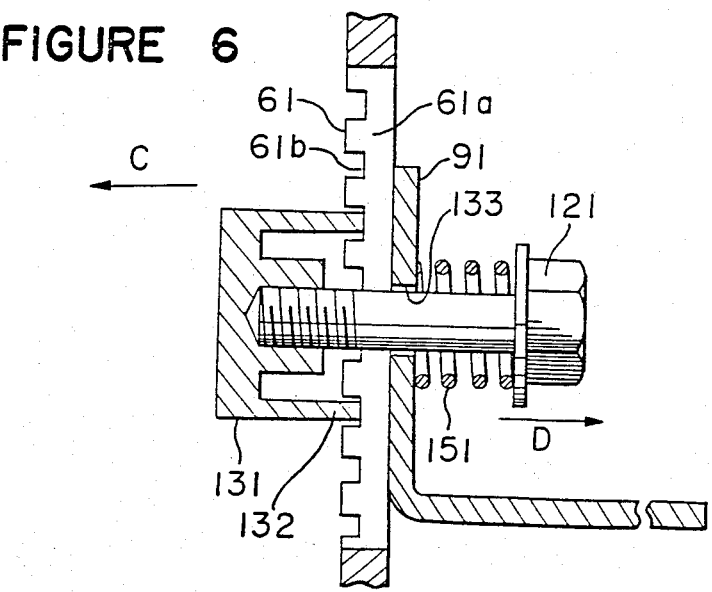
FIG. 6 is an enlarged view similar to FIG. 5 of another embodiment of the present invention.

FIG. 6 shows another embodiment of the present invention. In this embodiment, it is so constructed that a handling knob 131 is adapted to fit to a protection cover 61 to decide the position of a belt separation preventing plate 91. Namely, plural recesses 61b are formed on the outer surface of the protection cover 61 and on both sides of a guide slot 61a extending vertically in the protection cover at a fixed interval. The knob 131 is secured to one end of a bolt 121 as a supporting body for the belt separation preventing plate 91. Since the bolt passes through a through-hole 133 formed in the plate 91, the plate is movable along the axial line of the bolt 121. A compression spring 151 is interposed between the head of the bolt 121 and the plate 91 in a compressive state. The knob 131 has an outer size sufficiently greater than the width of the guide slot 61a and is provided with at the portion opposing the recesses 61b at least one projection 132 to fit thereinto. Accordingly, by pulling the knob 131 in the arrow mark direction C, the knob 131 is moved against the compressive force of the spring 151 from an engaged state as shown in FIG. 6, whereby it is released from engagement with the recesses 61b. Holding the knob 131 allows the belt separation preventing plate 91 to move along the longitudinal direction (the vertical direction in this embodiment) of the guide slot 61a. By loosening an operator's hand from the knob 131 after having adjusted the position of the plate 91, the knob 131 returns in the arrow mark direction D to engage with the protection cover 61 thereby fixing the position of the plate 91.

Thus, in accordance with the present invention, a belt separation preventing plate is adapted to be fitted to the inner side of a protection cover by the spring pressure of a spring device so as to prevent a belt from coming off a motor pulley. Accordingly, the plate can be easily moved along a guide slot formed in the protection cover without using any tool such as a spanner to thereby allow easy adjustment of the position of the plate, whereby an economical device for preventing separation of the belt can be provided.

We claim:

1. A device for preventing separation of a belt from a motor pulley which comprises:
    (a) a protection cover which covers a side portion of a pulley fixed to the output shaft of a motor and which is provided with a guide slot formed along the center line passing through the axial center of said output shaft;
    (b) a belt separation preventing plate supported by a supporting body passing through said guide slot of said protection cover so as to be movable along said guide slot in a predetermined direction; and
    (c) a retaining device for retaining said supporting body to fix said belt separation preventing plate to said protection cover by a spring pressure, wherein said belt separation preventing plate is adapted to be released from its engaging state caused by the spring pressure of said retaining device to thereby be movable along said guide slot.

2. A device according to claim 1 wherein said retaining device includes an operating body secured to said supporting body passing through said guide slot and a spring urging said operating body in a predetermined direction.

3. A device according to claim 1 wherein said retaining device includes one or more engaging recesses formed on either the surface of said protection cover near said guide slot or the surface of said belt separation preventing plate opposing said protection cover; one or more projections for engaging with said recesses formed in the other; an operating body attached to said supporting body passing through said guide slot; and a spring wound on said supporting body to urge said operating body in a predetermined direction.

4. A device according to claim 1 wherein said retaining device includes one or more engaging recesses formed on either the surface of said protection cover near said guide slot or one end opposing said protection cover of said operating body attached to said supporting body; one or more projections for engaging with said engaging recesses formed in the other; and a spring wound on said supporting body to urge said operating body in a predetermined direction.

5. A device according to claim 1 wherein said retaining device includes one or more engaging recesses formed on the inner surface of said protection cover near said guide slot so as to be at the right angle to the guiding direction of said guide slot; one or more projections formed on the surface opposing said projection cover of said belt separation preventing plate so as to be selectively fitted to said engaging recesses; an operating body attached to said supporting body; and a spring urging said operating body in a predetermined direction to force said projections of said plate to bring it into engagement with said recesses of said protection cover through said supporting body.

6. A device according to claim 1 wherein said retaining device includes a plurality of engaging recesses formed on the outer surface of said protection cover near said guide slot so as to be at the right angle to the guiding direction of said guide slot; an operating body which is attached to said supporting body and is provided with one or more projections formed opposing said engaging recesses of said protection cover to be selectively fitted thereto; and a spring interposed between said supporting body and said belt separation preventing plate in such a manner that it urges said supporting body in a predetermined direction to engage said projections of said operating body with said engaging recesses of said protection cover.

* * * * *